No. 784,928. PATENTED MAR. 14, 1905.
W. DAVES.
RAIL JOINT.
APPLICATION FILED NOV. 23, 1904.
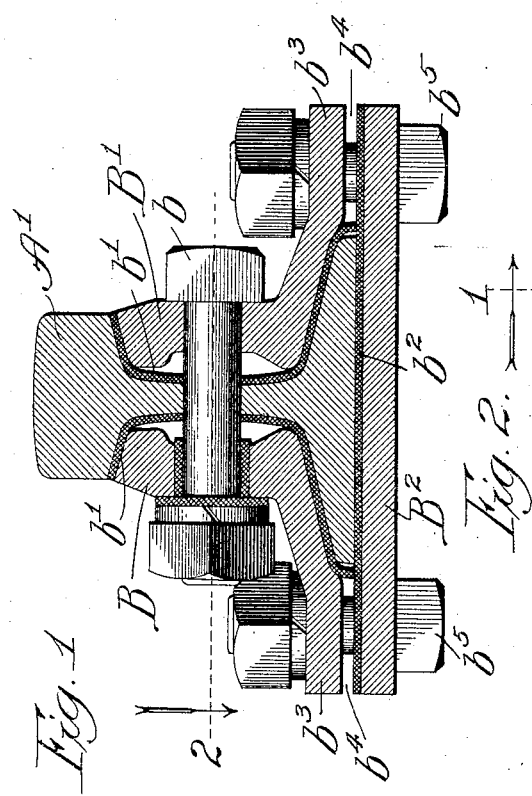
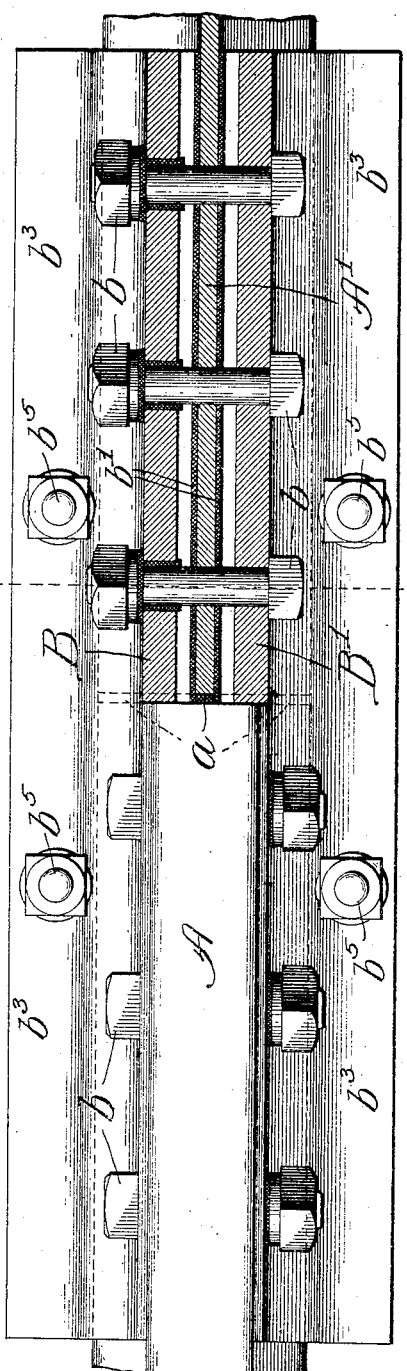
Witnesses:
Chas. E. Gaylord.
John Enders.
Inventor:
William Daves,
By Dyrenforth, Dyrenforth & Lee,
Att'ys.

No. 784,928. Patented March 14, 1905.

UNITED STATES PATENT OFFICE.

WILLIAM DAVES, OF BLOOMINGTON, ILLINOIS, ASSIGNOR OF ONE-FOURTH TO W. A. FREESE, OF BLOOMINGTON, ILLINOIS, AND ONE-FOURTH TO G. W. QUACKENBUSH, OF MARSHALL, MISSOURI.

RAIL-JOINT.

SPECIFICATION forming part of Letters Patent No. 784,928, dated March 14, 1905.

Application filed November 23, 1904. Serial No. 234,076.

*To all whom it may concern:*

Be it known that I, WILLIAM DAVES, a citizen of the United States, residing at Bloomington, in the county of McLean and State of Illinois, have invented a new and useful Improvement in Rail-Joints, of which the following is a specification.

My invention relates particularly to insulated rail-joints; and my primary object is to provide an improved joint of this character having special provision against relative movement of its parts in service, whereby breaking down or wearing out of the insulation is obviated.

The invention is illustrated in its preferred embodiment in the accompanying drawings, in which—

Figure 1 represents a transverse section of the improved joint, taken as indicated at line 1 of Fig. 2; and Fig. 2, a view partly in plan and partly in section, the section being taken as indicated at line 2 of Fig. 1.

In the preferred construction A A' represent rails having adjacent ends separated by insulation $a$, B B' fish-plates of special construction, which cross the plane of the insulation $a$ and are joined to the webs of the rails by bolts $b$ in a well-known manner, being electrically separated from the rail by sheets of insulation $b'$, however, and $B^2$ a base-plate upon which is laid a sheet of insulation $b^2$, upon which insulation the bases of the end portions of the rails bear. The fish-plates differ from the usual fish-plates in having at their lower portions substantially horizontal outwardly-projecting flanges $b^3$, whose lower surfaces are located above the plane of the lower surfaces of the bases of the rails. The base-plate $B^2$ is wider than the base of the rail, and its laterally-projecting edge portions are separated from the horizontal flanges of the fish-plates by spaces $b^4$, as shown. The lateral edge portions of the base-plate are joined to the flanges of the fish-plate by bolts $b^5$, and thus is provided a means of securely clamping the base of the rail between the base-plate and the fish-plates, it being understood, of course, that the fish-plates find bearings on the base-flanges of the rail. The fish-plates wedge between the top and bottom flanges of the rails in the usual manner, and the rails are thus securely clamped between the fish-plates themselves. Suitable insulation is provided for the bolts $b$, the preferred arrangement being to insulate the bolts on one side of the insulation $a$ from one fish-plate and those on the opposite side from the other fish-plate, as shown. This is a mere matter of preference, however, as it is essential only that the electric discontinuity of the rail be maintained.

It will be understood that my invention is based upon the theory that absolute relative immobility of parts should be maintained in the rail-joint so far as possible, and my construction is admirably adapted to accomplish this result, thus preventing constant chafing of the insulation, particularly the insulation $a$. To compensate for any natural wear upon or thinning of the insulating-sheets, the bolts may be tightened, as required, both at the webs of the rails and at the base-flanges thereof. It is contemplated, of course, that expansion and contraction of the rails shall be provided for in the usual manner at the uninsulated joints. In practice the base-plate $B^2$ will rest upon a tie or ties, as will be at once understood.

Minor changes in details of construction within the spirit of my invention may be made. Hence no undue limitation should be understood from the foregoing detailed description.

What I regard as new, and desire to secure by Letters Patent, is—

In an insulated rail-joint, the combination of rails having their adjacent ends electrically separated, a base-plate supporting the end portions of the rails, insulation interposed between the base-plate and the bases of the rails, fish-plates embracing the rails and having bearings on the base-flanges of the rails, and having, also, outturned flanges at their bases, the base-plate having lateral edge portions projecting beneath the fish-plate flanges and separated therefrom by spaces, bolts joining the fish-plates and passing through the rail-webs, whereby the rails are clamped between the fish-plates, suitable insulation for the fish-plates, and bolts connecting the fish-plate flanges with the lateral portions of the base-plate, whereby the base-flanges of the rails are securely clamped, substantially as and for the purpose set forth.

WILLIAM DAVES.

In presence of—
L. HEISLAR,
J. H. LANDES.